UNITED STATES PATENT OFFICE.

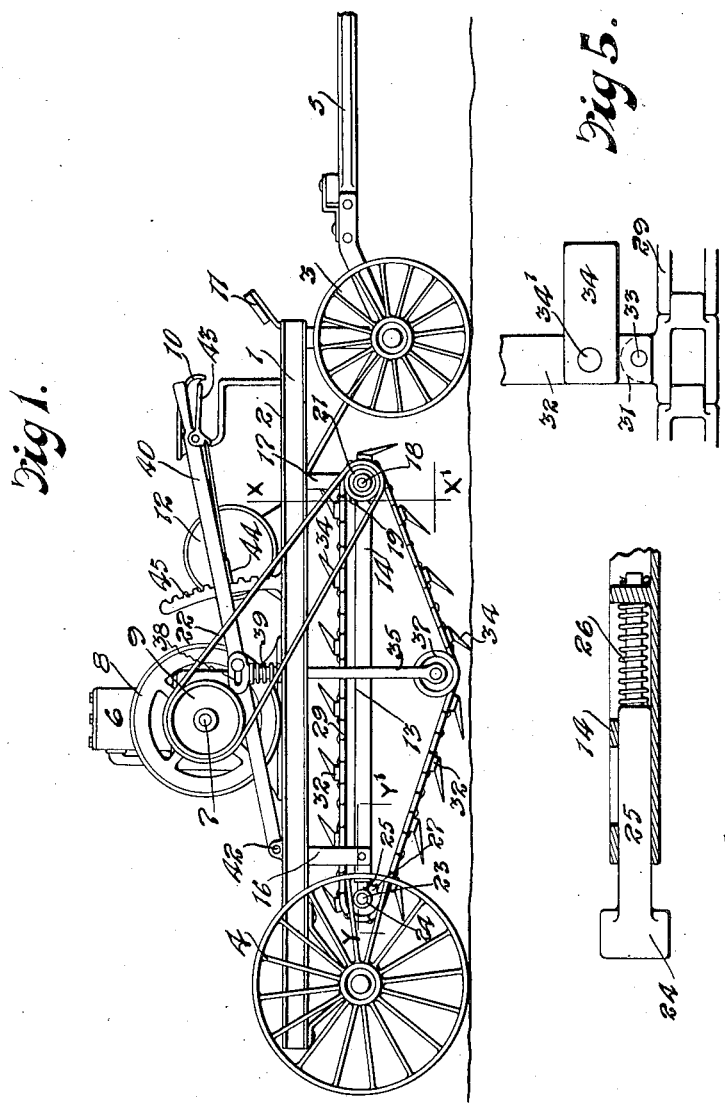

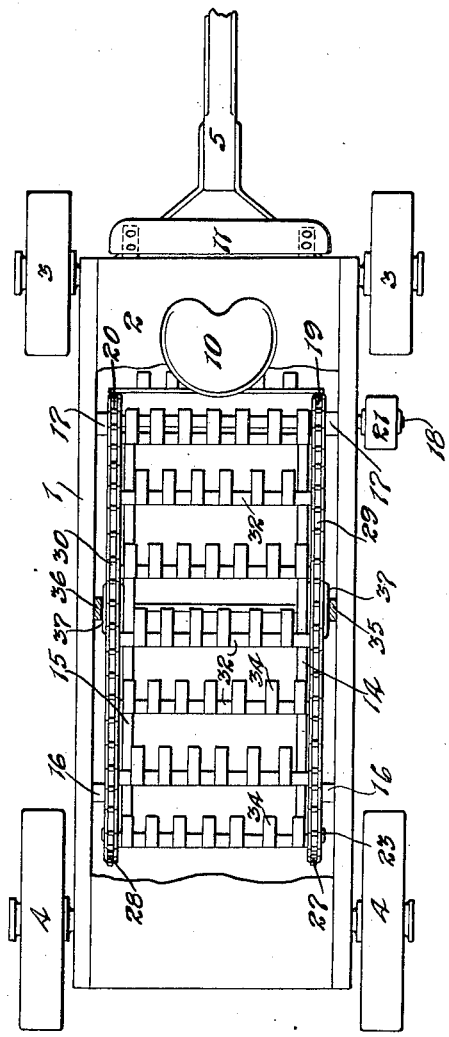

ROBERT J. WILSON, OF BEAVER HILLS, SASKATCHEWAN, CANADA.

TRACTOR-PLOW.

1,092,086. Specification of Letters Patent. Patented Mar. 31, 1914.

Application filed November 18, 1912. Serial No. 732,137.

*To all whom it may concern:*

Be it known that I, ROBERT J. WILSON, of the town of Beaver Hills, in the Province of Saskatchewan, Canada, have invented certain new and useful Improvements in Tractor-Plows, of which the following is the specification.

The invention relates to an improved form of plow which can be drawn over a field and which will cut or spade the ground as the machine is passed over it the device being particularly useful for breaking the virgin land the present device being arranged so that it can be drawn by horses.

A further object of the invention is to construct the device so that the depth of cut can be adjusted by the simple manipulation of levers.

With the above objects in view the invention consists essentially in a main frame carried by rear and forward carriage wheels and provided with a suitable platform, an engine mounted on the platform and adjustable endless chains, carrying cutting blades or spades supported from the engine frame and means for depressing the chains and forcing the blades into the ground, the parts being arranged and constructed as hereinafter more particularly described.

Figure 1 is a side view of the machine. Fig. 2 is a plan view of the same with a portion of the platform broken away. Fig. 3 is a vertical cross sectional view through the machine the section being taken in the plane denoted by the line X—X' Fig. 1. Fig. 4 is an enlarged detailed horizontal sectional view through the conveyer frame, the section being taken in the plane denoted by the line Y—Y' Fig. 1. Fig. 5 is an enlarged detailed plan view of a portion of one of the chains showing the manner in which the cross bars are connected thereto.

In the drawings like characters of reference indicate corresponding parts in each figure.

1 represents a main frame fitted with a suitable platform 2 and mounted forwardly on carriage wheels 3 and rearwardly on traction wheels 4 the carriage wheels being connected in the usual way with a tongue 5.

6 represents a gas engine of any approved type mounted permanently on a platform more or less centrally and 7 represents the main shaft of the engine which shaft carries the usual fly wheel 8 and drive pulley 9.

10 represents a driver's seat and 11 a foot-board adjoining the seat.

12 represents a gasolene tank for supplying fuel to the engine.

Beneath the main frame I have located a conveyer frame 13 formed from two angle iron bars 14 and 15 suspended from the main frame by pairs of brackets 16 and 17.

18 is a cross shaft mounted rotatably in the forward ends of the bars 14 and 15 and supplied with a pair of chain wheels 19 and 20 which are fixed in any suitable way to the shaft.

21 is a pulley secured permanently to the outer end of the shaft 18 and connected by a belt 22 with the pulley 9 already referred to.

23 is a second cross shaft having the ends thereof rotatably mounted in bearings 24 formed on the rear ends of shanks 25 slidably mounted in the rear ends of the angle bars 14 and 15 respectively. Spiral springs 26 are placed on the shanks and tend to hold them normally in their rearmost positions. The shaft 23 carries also a pair of chain wheels 27 and 28 similar to those 19 and 20 on the shaft 18.

29 and 30 are endless chains passing around the chain wheels, certain of the links of the chains being supplied with inwardly extending lugs 31 carrying cross slats or bars 32 connected to the lugs by pins or rivets 33.

34 are spades or cutting blades permanently secured to the bars 32 by bolts or rivets 34'. The spades are inclined slightly to the bars and are arranged in staggered relation one to the other on adjoining bars.

35 and 36 are a pair of upright arms passing slidably through the platform and having their lower ends supplied with flanged rollers 37 and their upper ends fitted with enlarged heads supplied with elongated slots 38. The rollers are arranged to ride continuously on the back side of the under portions of the chains 29 and 30.

39 are spiral springs on the arms located between the enlarged heads 38 thereof and the platform.

40 and 41 are levers pivotally secured rearwardly at 42 to the frame and having their forward ends located within convenient range of the driver's seat. The levers are supplied with hand latches 43 and detents 44 the detents operating over quadrants 45 fastened to the platform.

When the machine is used it is drawn over the field by horses attached to the tongue 5. The engine is started and it operates the conveyer to cause the chains to revolve. The attendant can set the levers to depress the chains so that the spades will dig whatever depth is required. It will be seen that when the levers are operated the shanks 25 will slide forward to accommodate the chains.

It will of course be understood that if desired the draft animals could be dispensed with and the engine could be utilized to drive the traction wheels. It would of course be then necessary to supply some suitable kind of steering mechanism to guide the front wheels.

What I claim as my invention is:—

1. The combination comprising a portable main frame, a conveyer frame suspended beneath the main frame, a cross shaft rotatably mounted forwardly in the conveyer frame, a rotatable cross shaft adjustably mounted rearwardly in the main frame, chain wheels on the shafts, endless chains mounted on the chain wheels, cross bars carried by the chains, means for rotating the forward cross shaft, angularly disposed cutting blades secured to the cross bars, the blades on the adjoining cross bars being staggered, arms slidably mounted in the frame, means for depressing the arms and a flanged pulley located at the lower ends of the arms and riding on the back face of the under sides of the chains, as and for the purpose specified.

2. The combination comprising a main frame mounted forwardly and rearwardly on wheels, an engine mounted on the main frame, a conveyer frame suspended beneath the main frame, a forward cross shaft rotatably mounted in the forward end of the conveyer frame, opposing spring pressed shanks slidably mounted in the rear end of the conveyer frame, said shanks being fitted with bearings, a rear cross shaft rotatably mounted in the bearings, chain wheels mounted on the front and rear shafts, endless chains connecting the chain wheels, means operated by the engine for rotating the front shaft, cross bars secured to the chains, angularly disposed cutting blades secured to the cross bars, the blades on adjoining bars being staggered, vertically directed arms slidably mounted in the main frame, said arms having their upper ends provided with horizontally disposed elongated slots, spiral springs normally suspending the arms, flanged pulleys rotatably mounted in the lower ends of the arms and riding on the upper faces of the under sides of the chains, levers pivotally mounted on the frame, pins carried by the levers and entering the slots aforesaid, quadrants adjoining the levers and suitable hand latches and detents carried by the levers the detents operating over the quadrants, as and for the purpose specified.

Signed at Yorkton this 30th day of July 1912.

ROBERT J. WILSON.

In the presence of—
W. S. WALTON,
FRANK C. DRAPER.

Copies of this patent may be obtained for five cents each, by addressing the "Commissioner of Patents, Washington, D. C."